Feb. 12, 1946.  E. R. KANHOFER  2,394,694
ISOMERIZATION OF SATURATED HYDROCARBONS
Filed July 18, 1942
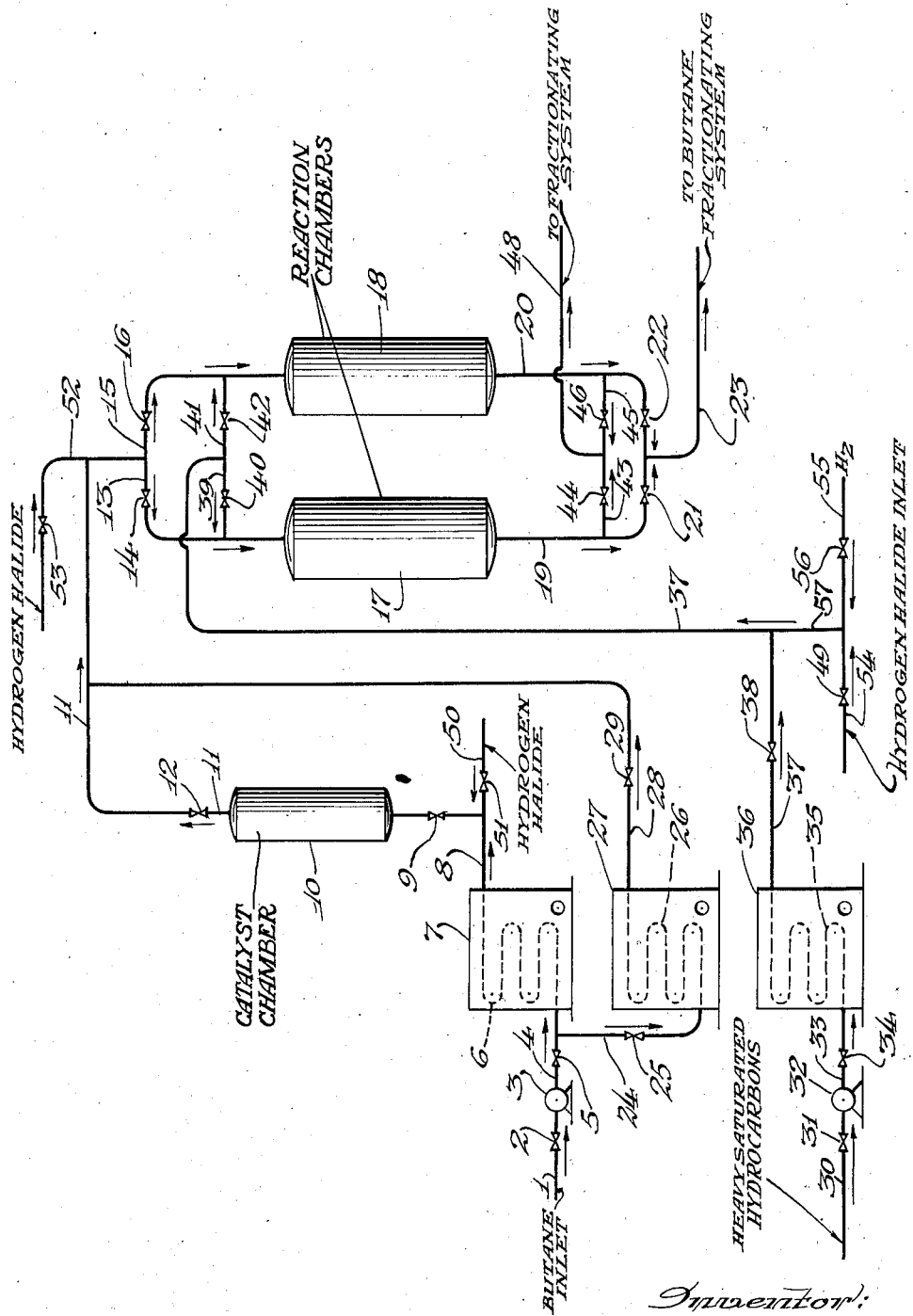
Inventor:
Elmer R. Kanhofer
By Lee J. Gary
Attorney.

Patented Feb. 12, 1946

2,394,694

UNITED STATES PATENT OFFICE 2,394,694

ISOMERIZATION OF SATURATED HYDROCARBONS

Elmer R. Kanhofer, Chicago, Ill., assignor to Universal Oil Products Company, Chicago, Ill., a corporation of Delaware Application July 18, 1942, Serial No. 451,473

12 Claims. (Cl. 260—683.5)

The present invention relates to the production of isomeric hydrocarbons from saturated hydrocarbons and is primarily concerned with improvements in the method of conducting such reactions.

The production of isomeric hydrocarbons has become increasingly important in the chemical and motor fuel industries, particularly with respect to paraffinic hydrocarbons since the isomeric paraffins are in general more reactive than their normal or less branched chain counterparts. For example, hydrocarbons such as isobutane and isopentane and the like may be reacted with olefinic hydrocarbons to form alkymers possessing high antiknock properties. These materials may be blended with other constituents, such as straight run gasoline and catalytically cracked gasoline to form high antiknock aviation fuels. The isomeric hydrocarbons, because of their high reactivity, are also used to a great extent as starting materials in many organic syntheses and are therefore more desirable than their normal and less branched isomers.

It is well-known to those skilled in the art that in general compounds of the Friedel-Crafts type will catalyze to some extent the isomerization reaction. These catalysts, however, besides influencing the isomerization reaction also have a tendency to react with the hydrocarbons to form undesirable hydrocarbon-catalyst complexes commonly termed sludge. The economic feasibility of the isomerization process is dependent primarily on the yield of isomeric hydrocarbons obtained per unit weight of catalyst consumed which will be controlled to a large extent by the consumption of the catalyst in the formation of sludge. Various modifications in the isomerization process have been made to attempt to increase the yield of desired isomeric hydrocarbons per unit weight of catalyst consumed. It has been found that the addition to the reactants of hydrogen halides or materials which generate hydrogen halide in situ tends to increase the ability of the Friedel-Crafts type catalyst to influence the isomerization reaction. It has also been found that by depositing the metallic halide catalyst on a relatively inert support or spacing agent more catalytic surface per unit weight of catalyst will be exposed to the reactants and higher rates of conversion may be obtained.

It is an object of the invention to provide an improved method of isomerization wherein catalyst which has been used for the isomerization of normal butane is subsequently used for the conversion of hydrocarbons which isomerize more readily. In this manner the effective utilization of the catalyst is substantially increased, and as a result, the actual catalyst consumption and cost in the isomerization operation based on the production of isomeric hydrocarbons per unit weight of catalyst is decreased.

In one embodiment the invention comprises contacting normal butane with an isomerization catalyst under conditions regulated to form a normal butane-catalyst mixture containing an amount of catalyst adequate to promote subsequent isomerization, commingling the normal butane-catalyst mixture with hydrogen halide in a packed reaction zone under conditions regulated to maintain the reactants in substantially vapor phase and to convert a portion of the normal butane to isobutane, and periodically interrupting the flow of said reactants and introducing into said reaction zone higher boiling hydrocarbons to convert a substantial portion of the latter into isomeric hydrocarbons by the action of the catalyst deposited on the packing material during the previous butane isomerization step.

The invention will be more fully described in the following explanation of the accompanying diagrammatic drawing which illustrates in conventional side elevation, one type of apparatus in which the invention may be accomplished.

For simplification, only those elements which are essential to the explanation of the invention have been included.

Referring to the drawing, normal butane is introduced through line 1 containing valve 2 into pump 3 which discharges through line 4 containing valve 5 into heating coil 6 disposed in furnace 7. A portion of the charge stream may be directed through line 24 containing valve 25 into heating coil 26 in furnace 27 and recombined with the portion of charging stock passing through furnace as hereinafter set forth. The temperature to which the butane passing through coil 6 is raised is dependent upon the temperature desired in chamber 10 which will be determined by the type of catalyst being used and the amount of hydrogen halide to be introduced into the reaction mixture. The reactants will ordinarily be heated to a temperature high enough to compensate for any loss in heat in the passage of the reactants through line 8 and still maintain a temperature of from about 50 to about 300° F. and preferably between 150 to 210° F. in chamber 10. The hydrocarbons, after being heated to the desired temperature, leave furnace 7 through line 8 containing valve 9 and are directed to catalyst chamber 10.

The catalyst in chamber 10 may comprise the halides of aluminum, zirconium, zinc, and iron, either alone or admixed with one another, or mixed with such materials as antimony, arsenic, bismuth and phosphorus. It will be understood that these catalysts are not necessarily equivalent in their isomerizing activity but by the regulation of operating conditions to compensate for variations in activity the novel results herein set forth may be obtained.

It is ordinarily desirable to maintain the butane introduced in chamber 10 in substantially liquid phase. In operating in this manner the amount of catalyst removed per unit weight of hydrocarbon will be dependent upon the temperature which will control the solubility of the catalyst in the butane. However, this invention is not limited to liquid phase in chamber 10 since a vapor or mixed phase operation may be conducted satisfactorily.

The portion of the charging stock which is directed through furnace 27 is utilized as a heat carrying means to provide the necessary heat to raise the combined stream in line 11 to the desired isomerization conversion temperature. This heated stream leaves furnace 27 through line 28 containing valve 29 and is commingled in line 11 with the fluid mixture formed in chamber 10. The entire stream in admixture with hydrogen halide introduced as hereinafter set forth is directed through either line 13 or line 15 containing valves 14 and 16 respectively, to reaction chamber 17 or 18 respectively.

To further simplify the explanation of the drawing, it has been assumed that the normal butane is being introduced into chamber 17 and the higher boiling hydrocarbons into chamber 18.

The hydrogen halide activator may be introduced through either line 50 containing valve 51 or through line 52 containing valve 53. The point of introduction of hydrogen halide will determine the zone in which most of the butane isomerization occurs. The concentration of the hydrogen halide in the butane stream will vary depending upon the particular catalyst and the operating conditions selected, but will ordinarily be less than 40 mol per cent of the butane-catalyst mixture. The heated butane-catalyst and hydrogen halide mixture is introduced into chamber 17 wherein a substantial portion of the normal butane is converted into isobutane. It is essential in operating in accordance with the invention that chamber 17 be maintained under conditions such that the butane is in substantially vapor phase. The metallic halide catalyst carried in by the normal butane deposits upon the packing disposed in zone 17 forming an active isomerizing catalyst.

The packing in zone 17 may comprise such materials as porcelain, pumice, firebrick, quartz, activated charcoal, other activated carbons, diatomaceous earth, kaolin, raw and acid-treated clays, silica gel, alumina, magnesia, zirconia, titania, composites of silica with alumina and/or zirconia and also metals possessing considerable surface as spongy iron.

The temperature in zone 17 will ordinarily be within the range of 50 to 600° F. and preferably between 150 to 250° F. and the pressure will vary accordingly so that a substantial vapor phase is maintained. The reaction products consisting principally of isobutane and unconverted normal butane leave reaction zone 17 through line 19 containing valve 21 and are directed through line 23 to a suitable fractionating system wherein the desired products are separated from the unconverted material which may be recycled to the reaction zone. After a sufficient amount of metallic halide catalyst has been deposited upon the support disposed within reaction zone 17, the flow of the butane-catalyst mixture to zone 17 is interrupted by closing valve 14 and is directed to zone 18 through line 15 containing valve 16. Simultaneously with the interruption of the flow of the normal butane-catalyst mixture to zone 17, heavier saturated hydrocarbons, such as pentane, hexane, heptane or mixtures thereof or fractions of straight run gasolines or naphthas are introduced through line 30 containing valve 31 into pump 32 which discharges through line 33 containing valve 34 into heating coil 35 in furnace 36, the hydrocarbons passing through heating coil 35 are raised to the desired temperature, which is dependent upon the hydrocarbons being treated and the catalyst used, but is ordinarily within the range of 50 to 600° F. and preferably between 150 to 250° F. The heated reactants are directed through line 37 containing valve 38 into line 39 containing valve 40 into packed reaction zone 17. These hydrocarbons contact the active isomerizing catalyst which has previously been formed by the deposition of the metal halide catalyst from the butane isomerization operation and a substantial portion converted to isomeric hydrocarbons. This isomerization reaction may be carried out under pressures ranging from substantially atmospheric to about 1000 pounds per square inch or more. The operation may be satisfactorily conducted in either a liquid, mixed, or vapor phase.

It has been found that the addition of small amounts of hydrogen tends to decrease the amount of undesirable side reactions which may occur during the operation. Hydrogen up to about 20 mol per cent of the hydrocarbon-hydrogen halide mixture may be introduced through line 55 containing valve 56 into line 57 where it is commingled with the hydrogen halide being introduced through line 54 containing valve 49. The resulting mixture is directed through line 57 into line 37 where the mixture of hydrogen halide and hydrogen is commingled with the charging stock.

The reaction products leave packed zone 17 through line 19 into line 43 containing valve 44 and are directed through line 48 to a suitable fractionating system wherein the desired products are separated from the unconverted material which may be recycled to the reaction zone 17.

The following example illustrates the results which may be obtained when operating in accordance with the invention. It is not intended, however, that this example shall place any undue limitations on the general broad scope of the invention.

*Example*

Normal butane along with about 12 mol per cent of HCl is heated to 181° F. under a pressure of 250 pounds per square inch and passed through a bed of granular aluminum chloride disposed within an insulated reaction chamber. The analysis of the resulting reaction products is as follows:

| | Mol per cent |
|---|---|
| Isobutane | 40.3 |
| Normal butane | 55.6 |
| Propane | 1.8 |
| Pentanes | 2.3 |
| | 100.0 |

The flow of the normal butane is interrupted after about four hours processing and directed into a second reaction zone. A 59 octane number acid treated commercial hexane fraction along with 10 mol per cent HCl heated to a temperature of 212° F. under a pressure of 500 pounds per square inch is introduced into the first reaction zone.

The octane number of the hexane is raised from 59 to 78, an improvement of 19 octane numbers. By alternately passing the butane-catalyst mixture and the hexane through the reaction zones in the manner explained above a yield of isomerized product amounting to about 40 gallons of product per pound of aluminum chloride consumed is obtained.

I claim as my invention:

1. A continuous process for the simultaneous isomerization of normal butane and a higher boiling saturated hydrocarbon which comprises introducing a stream containing normal butane and a metallic halide isomerizing catalyst to a first reaction zone containing a solid packing material, subsequently diverting said stream from the first zone and introducing the same to a second reaction zone containing a solid packing material, maintaining each of said zones at an isomerization temperature at all times and, during the introduction of said stream thereto, simultaneously isomerizing normal butane therein and depositing metallic halide catalyst on the packing material in each of the zones, during the diversion of said stream from the first to the second zone introducing to the first zone a separate stream of said higher boiling saturated hydrocarbon and isomerizing the latter in the presence of metallic halide catalyst deposited as aforesaid from the first-named stream on the packing material in said first zone, and periodically alternating the introduction of said streams into the respective reaction zones so that both of the zones are in simultaneous operation with normal butane being isomerized and catalyst being deposited in one of the zones while the higher boiling saturated hydrocarbon is being isomerized in the other and each of the zones being successively employed in the isomerization of normal butane and in the isomerization of the higher boiling saturated hydrocarbon.

2. A continuous process for the simultaneous isomerization of normal butane and a higher boiling paraffin which comprises introducing a stream containing normal butane, a hydrogen halide and a metallic halide isomerizing catalyst to a first reaction zone containing a solid packing material, subsequently diverting said stream from the first zone and introducing the same to a second reaction zone containing a solid packing material, maintaining each of said zones at an isomerization temperature at all times and, during the introduction of said stream thereto, simultaneously isomerizing normal butane therein and depositing metallic halide catalyst on the packing material in each of the zones, during the diversion of said stream from the first to the second zone introducing to the first zone a separate stream of said higher boiling paraffin and a hydrogen halide and isomerizing the last-named paraffin in the presence of metallic halide catalyst deposited as aforesaid from the first-named stream on the packing material in said first zone, and periodically alternating the introduction of said streams into the respective reaction zones so that both of the zones are in simultaneous operation with normal butane being isomerized and catalyst being deposited in one of the zones while the higher boiling paraffin is being isomerized in the other and each of the zones being successively employed in the isomerization of normal butane and in the isomerization of the higher boiling paraffin.

3. A continuous process for the simultaneous isomerization of normal butane and a higher boiling paraffin which comprises introducing a stream containing normal butane and an aluminum halide to a first reaction zone containing a solid packing material, subsequently diverting said stream from the first zone and introducing the same to a second reaction zone containing a solid packing material, maintaining each of said zones at an isomerization temperature at all times and, during the introduction of said stream thereto, simultaneously isomerizing normal butane therein and depositing aluminum halide catalyst on the packing material in each of the zones, during the diversion of said stream from the first to the second zone introducing to the first zone a separate stream of said higher boiling paraffin and isomerizing the latter in the presence of aluminum halide catalyst deposited as aforesaid from the first-named stream on the packing material in said first zone, and periodically alternating the introduction of said streams into the respective reaction zones so that both of the zones are in simultaneous operation with normal butane being isomerized and catalyst being deposited in one of the zones while the higher boiling paraffin is being isomerized in the other and each of the zones being successively employed in the isomerization of normal butane and in the isomerization of the higher boiling paraffin.

4. The process as defined in claim 1 further characterized in that said metallic halide comprises aluminum chloride.

5. The process as defined in claim 1 further characterized in that said separate stream containing the higher boiling saturated hydrocarbon comprises a paraffinic gasoline fraction.

6. The process as defined in claim 1 further characterized in that a hydrogen halide is introduced to the reaction zones simultaneously with said streams.

7. The process as defined in claim 2 further characterized in that said metallic halide comprises aluminum chloride.

8. The process as defined in claim 2 further characterized in that the hydrocarbon component of said separate stream is a paraffinic gasoline fraction.

9. The process as defined in claim 2 further characterized in that said metallic halide and said hydrogen halide are aluminum chloride and hydrogen chloride respectively.

10. The process as defined in claim 3 further characterized in that said separate stream comprises a gasoline fraction containing said higher boiling paraffin.

11. The process as defined in claim 3 further characterized in that the isomerization in said zones is effected in the presence of a hydrogen halide.

12. The process as defined in claim 3 further characterized in that said aluminum halide comprises aluminum chloride and in that hydrogen chloride is introduced to the reaction zones simultaneously with said streams.

ELMER R. KANHOFER.